(12) United States Patent
Warecki (10) Patent No.: US 11,076,581 B2
(45) Date of Patent: Aug. 3, 2021

(54) NESTED RACEWAY SYSTEM

(71) Applicant: Bonnie Jean Warecki, Ellenton, FL (US)

(72) Inventor: Bonnie Jean Warecki, Ellenton, FL (US)

(*) Notice: Subject to any disclaimer, the term of this patent is extended or adjusted under 35 U.S.C. 154(b) by 282 days.

(21) Appl. No.: 16/182,651

(22) Filed: Nov. 7, 2018

(65) Prior Publication Data

US 2020/0137989 A1 May 7, 2020

(51) Int. Cl.
*A01K 61/60* (2017.01)
*A01K 61/10* (2017.01)

(52) U.S. Cl.
CPC ............. *A01K 61/60* (2017.01); *A01K 61/10* (2017.01)

(58) Field of Classification Search
None
See application file for complete search history.

(56) References Cited

U.S. PATENT DOCUMENTS

| | | | | |
|---|---|---|---|---|
| 1,954,646 A * | 4/1934 | Pratt | ...................... | B65D 25/04 220/533 |
| 2,537,219 A * | 1/1951 | Girton | ...................... | A01J 7/02 220/4.16 |
| 4,198,924 A * | 4/1980 | Chapman | ............... | A01K 61/59 119/210 |
| 4,457,441 A * | 7/1984 | McCloughan | ......... | B65D 88/10 119/228 |
| 5,010,837 A * | 4/1991 | Hirose | .................... | B63B 35/44 114/256 |
| 5,329,719 A * | 7/1994 | Holyoak | ................ | A01K 61/60 43/6.5 |
| 5,450,818 A * | 9/1995 | Caillouet | ............... | A01K 61/10 119/223 |
| 6,305,323 B1 * | 10/2001 | Tsai | ....................... | A01K 61/54 119/234 |
| 7,069,875 B2 | 7/2006 | Warecki | | |
| 7,524,414 B1 * | 4/2009 | Barragan | .................. | E03F 1/00 210/163 |
| 7,690,330 B2 * | 4/2010 | Miller | .................... | A01K 63/04 119/228 |
| 10,709,117 B2 * | 7/2020 | Perslow | ............... | A01K 63/065 |
| 2009/0101553 A1 * | 4/2009 | Lucas | .................. | E03F 5/0401 210/164 |

(Continued)

FOREIGN PATENT DOCUMENTS

WO WO-2012022860 A1 * 2/2012 ............. A01K 63/02

*Primary Examiner* — Amy R Weisberg
(74) *Attorney, Agent, or Firm* — Epiphany Law, LLC (57) ABSTRACT

This disclosure provides a nested raceway system configured to be used with two or more nested vessels. More specifically, a nested raceway system includes a first vessel and a second vessel. In an embodiment, there may be more than two vessels. In another embodiment, the first vessel has a base with a head-end bulkhead, a tail-end bulkhead. The second vessel has a second base with a plurality of apertures thereon, a second head-end bulkhead, and a second tail-end bulkhead. The second vessel is nested (i.e., suspended) within the first vessel and creates at least two habitats within the first vessel. The plurality of apertures allows for small marine life, algae, or other valuable minerals to sink to the bottom to be removed or grown. In an embodiment, the first and second vessels are constructed of a floatable, durable, and flexible material.

23 Claims, 4 Drawing Sheets

(56) References Cited

U.S. PATENT DOCUMENTS

| | | | |
|---|---|---|---|
| 2009/0159010 A1* | 6/2009 | Spartz | A01K 63/003 |
| | | | 119/200 |
| 2010/0294202 A1* | 11/2010 | Lawrence | A01K 61/59 |
| | | | 119/211 |
| 2013/0180461 A1* | 7/2013 | Fujiyoshi | A01K 61/54 |
| | | | 119/234 |
| 2016/0376782 A1* | 12/2016 | Groff | C02F 1/004 |
| | | | 210/163 |
| 2017/0204746 A1* | 7/2017 | Ryon | B01D 29/33 |
| 2017/0251643 A1* | 9/2017 | Boudreau | B65D 81/262 |
| 2019/0271129 A1* | 9/2019 | Stephens | B01D 29/085 |

* cited by examiner

NESTED RACEWAY SYSTEM

FIELD

This invention relates to large elongated liquid holding vessels in which liquids and activities in and on the liquids can be contained and controlled, and more particularly to types of vessels used with a variety of raceways and aquacultures.

BACKGROUND

The following description is provided to assist the understanding of the reader. None of the information provided or references cited are admitted to be prior art.

The art of constructing elongated vessels for holding flowable material has been used in a number of industries. For example, elongated vessels that are capable of holding and controlling flowable materials has been used in food processing, swim training, testing of marine engines, waste management, aquaculture, and biofuel development. Typically, there has been one elongated vessel that is built of a heavy, inflexible material with limited options for controlling flowage, spaces within the vessel, and location of the vessel. One issue with elongated vessels (e.g., aquaculture raceways) is that they usually are large, immovable, and designed for one specific species.

In aquaculture, a raceway is defined as an elongated horizontal channel through which water flows from a head end to a tail end and are designed to raise high densities of marine life. In the past, raceways have been deployed in both natural and man made ponds as well as in buildings. However, raceways to this point have a plurality of deficiencies that negatively impact the densities and health of desired marine life. For example, raceways have failed to provide effective vertically-isolated zones for water flow. Further, raceways have failed to offer an effective means of controlling the lateral space for animal and plant management. Thus, a raceway that is capable of offering both an efficient means of controlling a plurality of vertical and lateral spaces is needed in order for a raceway to achieve maximum efficiency. That is, a raceway that offers a three-dimensional animal and plant management system is needed in order to maximize aquaculture efficiencies.

SUMMARY

The systems, methods and devices of this disclosure each have several innovative aspects, no single one of which is solely responsible for the desirable attributes disclosed herein.

This disclosure provides a nested raceway system configured to be used with two or more vessels. The nested raceway system includes a first vessel and a second vessel. In an embodiment, the nested raceway system may also include an airlift, a blower, a docking system, or a single point anchoring system. The airlift may be removable from a first window of the first vessel. The first vessel includes a base, a head-end bulkhead, and a tail-end bulkhead. The base includes a head edge, a tail edge, a first side edge, and a second side edge. The base extends from the head edge along a first centerline axis to the tail edge, and extends from the first side edge partially around the first centerline axis to the second side edge. The head-end bulkhead is mechanically secured to the head edge, and the tail-end bulkhead is mechanically secured to the tail edge. The head-end bulkhead includes first flow window, and the tail-end bulkhead includes a second flow window. In an embodiment, the head-end bulkhead and the tail-end bulkhead may include three flow windows on each bulkhead. The flow windows are designed to sit partially below a water line and allow for flowable materials to enter/exit a particular vessel.

The second vessel includes a second base, a second head-end bulkhead, and a second tail-end bulkhead. The second base includes a second head edge, a second tail edge, a third side edge, and a fourth side edge. The second base extends from the second head edge along a second centerline axis to the tail edge, and extends from the third side edge partially around the second centerline axis to the fourth side edge. The second head-end bulkhead may be mechanically attached to the second head-end, and the second tail-end bulkhead may be mechanically attached to the second tail-end. The second head-end bulkhead includes a third flow window, and the second tail-end bulkhead includes a fourth flow window. That is, each bulkhead has at least one flow window that allows for flowable materials to flow in and out of the vessel. In another embodiment, the second head-end bulkhead and second tail-end bulkhead may have one, two, three or more flow windows. The second base includes a plurality of apertures. The second vessel is nested (i.e., suspended) in the first vessel.

In another embodiment, the nested raceway system may include a third vessel. The third vessel includes a third base, a third head-end bulkhead, a third tail-end bulkhead. The base includes a plurality of apertures, a third head edge, a third tail edge, a fifth side edge, and a sixth side edge. In an example, the third base extends from the third edge along a third centerline axis to the tail edge, and extends from the fifth side edge partially around the third centerline axis to the sixth side edge. The third head-end bulkhead mechanically attaches to the third head-end, and the third tail-end bulkhead mechanically attaches to the third tail edge. The third head-end bulkhead includes a fifth flow window, and the third tail-end bulkhead includes a sixth flow window. The third vessel is nested within the second vessel.

In an embodiment, the first and second vessels are built using a chemically stable material that has a density of less than 1.0. In other words, the material that is used to create the vessels of the system is stable, and can float in water. In another embodiment, the first vessel may also include a quiet-zone bulkhead that is mechanically attached to the base from the first side edge to the second side edge a distance toward the head-end from the tail-end. The distance may define a quiet-zone that is configured to collect solid materials from the vessels at the bottom of the quiet-zone. The quiet-zone bulkhead includes at least one flow window.

The first and second vessels may be nested within each other such that the first centerline axis and the second centerline axis are the same axis. In another embodiment, the first edge extends to the second edge along an arc, the head-end bulkhead is a first semi-circular shape, and the tail-end bulkhead is a second semi-circular shape. The first semi-circular shape, the arc, and the second circular shape may be concentric. In other words, the first semi-circular shape, the arc, and the second circular shape may have a center that is on the first centerline axis or other axis.

The second vessel may also include a vertically hung material that extends parallel to the second centerline axis from the second head edge to the second tail edge. In an example, the vertically hung material extends from above a waterline to the second base. That is, the vertically hung material may separate habitats for marine life within the second vessel. The vertically hung material may be a netting, a bio-friendly netting, or other material with a plurality of apertures.

DETAILED DESCRIPTION

Reference will now be made to various embodiments, one or more examples of which are illustrated in the figures. The embodiments are provided by way of explanation of the invention, and are not meant as a limitation of the invention. For example, features illustrated or described as part of one embodiment may be used with another embodiment to yield still a further embodiment. It is intended that the present application encompass these and other modifications and variations as come within the scope and spirit of the invention.

Disclosed herein is nested raceway system that includes a first vessel and a second vessel. Such nested raceway system may be used to efficiently and reliably raise a variety of species of fish in a single system. Specifically, the nested raceway system allows for the separation of a plurality of habitats that may be suitable for a variety of marine life species. That is, the nested raceway system is capable of separation one, two, three, four, or more spaces within a vessel that allows for flowable materials through-out, and each of the spaces may have a habitat suitable to efficiently and safely raise a particular species of marine life. Further, the first vessel and the second vessel include at least two bulkheads each that may be removable from a base material. The removable bulkheads ensure that the nested raceway system can be transported safely and inexpensively. In other words, the removable bulkheads allow for the base material to be rolled-up and shipped in a smaller, more affordable, container without sacrificing the rigidity of the structure. Additionally, removable bulkheads include at least one flow window that allow for machines (e.g., an airlift) to be connected in order to create flowage throughout the system. Alternatively, flow may be created by using natural currents in an environment by allowing the nested raceways system to pivot (e.g., via single point anchoring system) and aligning the natural currents with the flow windows. That is, in environments that may not have reliable electricity, the nested raceway system may still be able to provide a reliable and profitable habitat for a variety of marine life species. In other words, the nested raceway system is suitable for a plurality of marine life species and capable to ship and deploy in a multitude of locations around the world.

Various embodiments of a nested raceway system are illustrated throughout FIGS. 1 through 6. The nested raceway system disclosed in these figures is configured to separate a plurality of spaces within a first vessel. In an embodiment, the nested raceway system has plurality vessels nested within the first vessel in order to create tiered spaces, where each space has a unique habitat. Further, in an embodiment, the nested raceways system may include a quiet-zone bulkhead to create a quiet-zone that is capable of collecting algae and other valuable nutrients from the water. In yet another embodiment, the first vessel or the plurality of vessels may have vertically hung material that separates a particular one of the vertically tiered spaces into a plurality of spaces within the particular one of the vertically tiered spaces. It should be appreciated that the extensible notebook disclosed herein is not limited by any material, number of spaces, or position of spaces.

Figure 1:
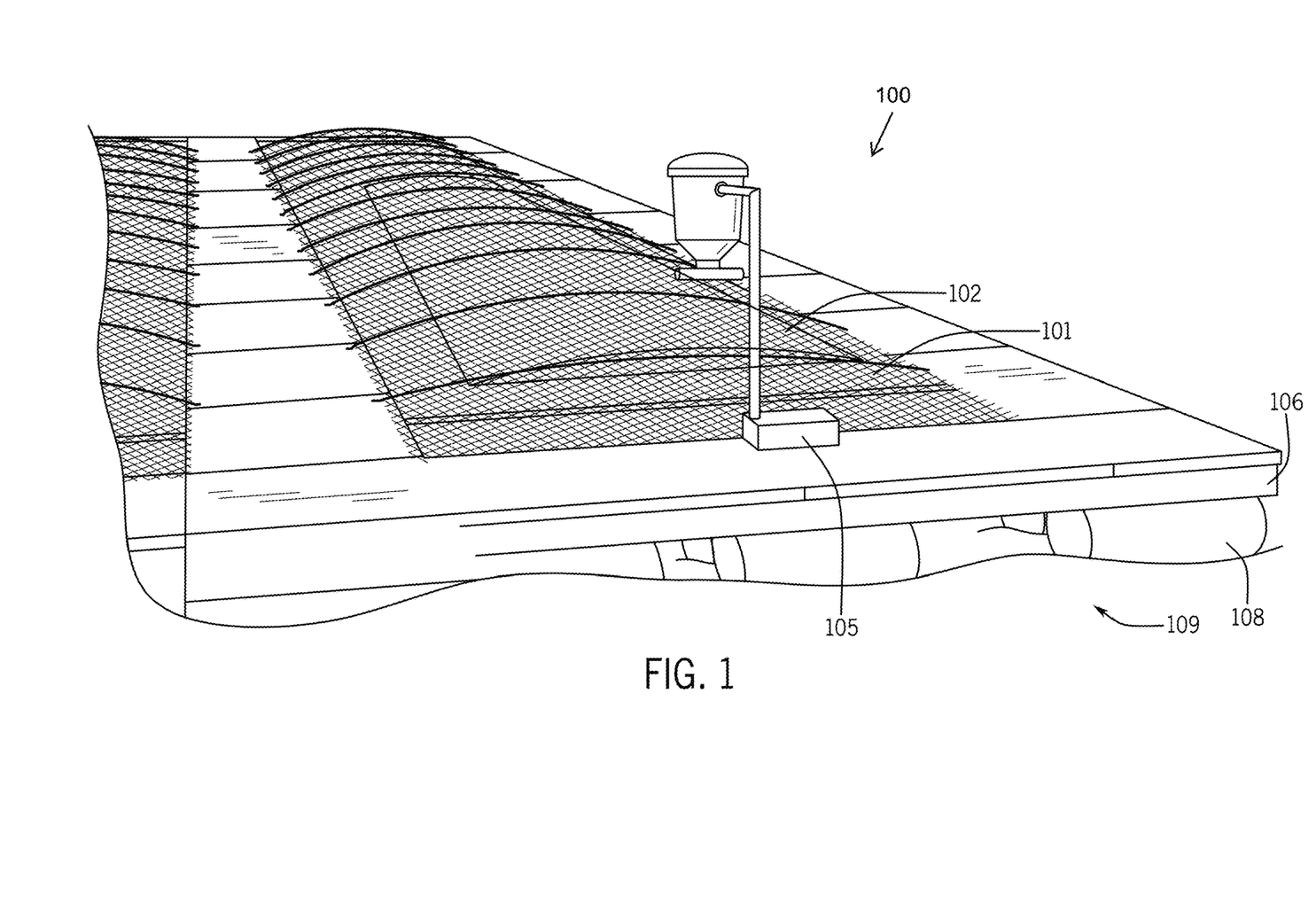
FIG. 1 depicts an isometric view of a nested raceway system in an operational environment in accordance with an illustrative embodiment.

FIG. 1 depicts an isometric view of a nested raceway system 100 in an operational environment in accordance with an illustrative embodiment. Specifically, the nested raceway system 100 includes a first vessel 101 and a second vessel 102. As depicted, the second vessel 102 is nested (e.g., floating, floated, or suspended) within the first vessel 101. In alternative embodiments, there may be one, two, three, four, five, six, seven, eight, nine, ten, eleven or more vessels in a nested raceway system 100 all nested within each other. In an embodiment, the nested raceway system may include a blower 105 that is configured to create a flowage throughout the first vessel 101 and the second vessel 102. In another embodiment, the nested raceway system may also include a docking system 106 that is floated via a plurality of flotation devices 108. The docking system 106 allows for operators to navigate around the first and second vessels 101 and 102 when the nested raceway system 100 is in water 109. In an embodiment, the first vessel 101 may be mechanically attached to the docking system. In alternative embodiments, the first vessel 101 may simply be floating by itself inside of the docking system 106.

Figures 2, 3, 4:
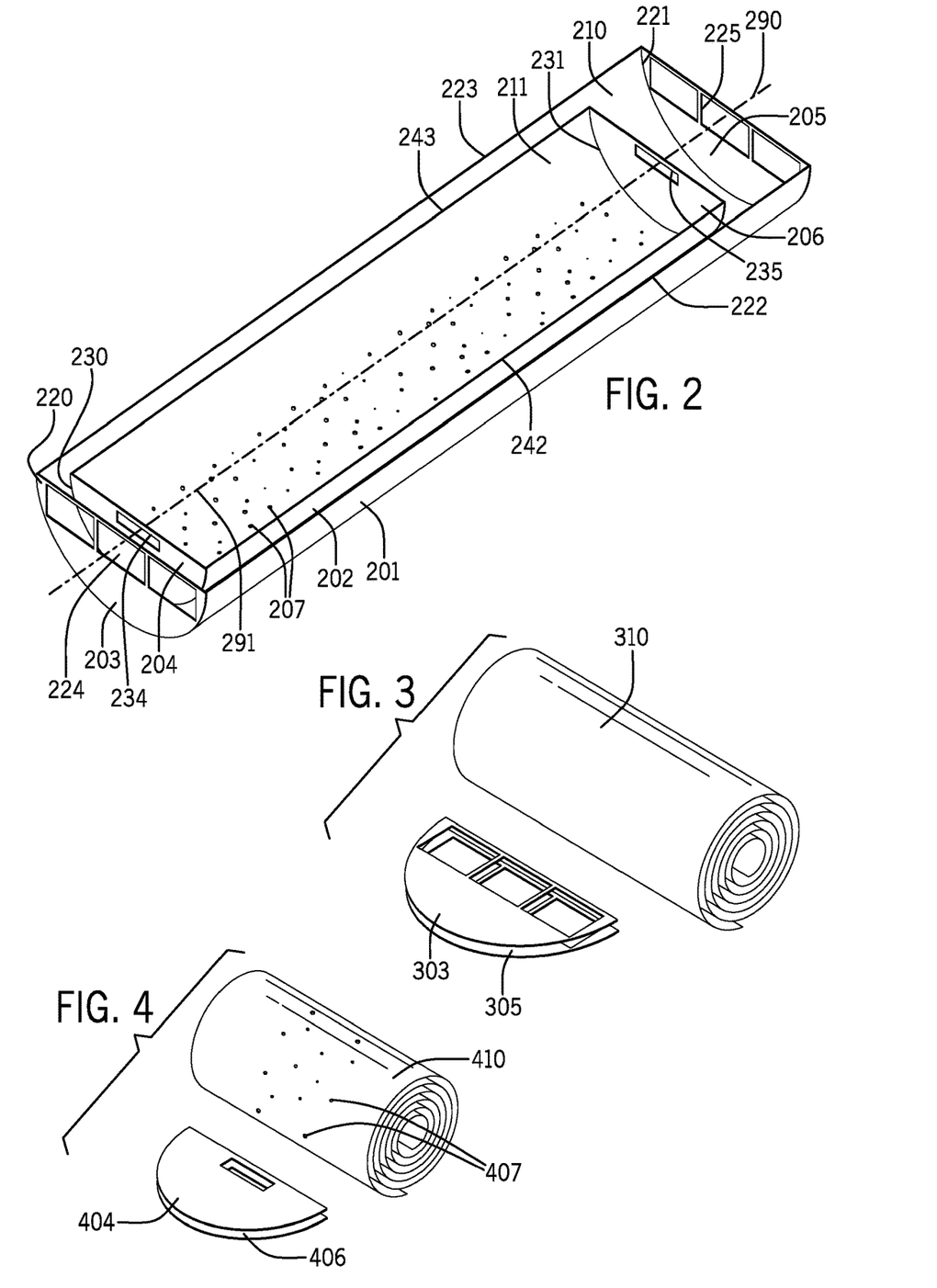
FIG. 2 depicts an isometric view of a nested raceway in accordance with an illustrative embodiment.
FIG. 3 depicts an isometric view of a first vessel in accordance with an illustrative embodiment.
FIG. 4 depicts an isometric view of a second vessel in accordance with an illustrative embodiment.

FIG. 2 depicts an isometric view of nested raceway 200 in accordance with an illustrative embodiment. The nested raceway 200 includes a first vessel 201 and a second vessel 202. The first vessel 201 includes a first base 210, a head-end bulkhead 203, and a tail-end bulkhead 205. The second vessel 202 includes a second base 211, a second head-end bulkhead 204, and a second tail-end bulkhead 206. The first base 210 includes a head edge 220, a tail edge 221, a first side edge 222, and a second side edge 223. That is, the first base 210 is a rectangular shape when laid flat. In alternative embodiments, the first base 210 may be of any shape that can be laid flat. The first base 210 extends along a first centerline axis 290 from the head edge 220 to the tail edge 221. The first base 210 also extends partially around the first centerline axis 290 as the first base 210 extends from the first side edge 222 to the second edge 223. In an embodiment, the first base 210 extends parallel to the first centerline axis 290 as it extends from the head edge 220 to the tail edge 221. Further, in an embodiment, the first base 210 extends in a semi-circular shape with the first centerline axis 290 at a center as the first base 210 extends partially around the first centerline axis 290 from the first side edge 222 to the second side edge 223. That is, the first base 210 creates a concave upward shape. In alternative embodiments, the first base 210 may extend in any shape (e.g., "U" shape) as the first base 210 extends partially around the first centerline axis 290 from the first side edge 222 to the second side edge 223.

The head-end bulkhead 203 is mechanically attached to the head edge 220. In an embodiment, the head-end bulkhead 203 is imperviously (i.e., water-tight) sealed to the head edge 220. In another embodiment, the head-end bulkhead 203 is removable attached to the head edge 220 via clips, latches, or other known mechanical fastening devices. The tail-end bulkhead 205 is mechanically attached to the tail edge 221. In an embodiment, the tail-end bulkhead 205 is imperviously (i.e., water-tight) sealed to the tail edge 221. In another embodiment, tail-end bulkhead 205 is removable attached to the tail edge 221 via clips, latches, or other known mechanical fastening devices. The head-end bulkhead 203 includes a first flow window 224 and the tail-end bulk head bulkhead 205 includes a second flow window 225. In an embodiment, the head-end bulkhead 203 includes three flow windows 224 and the tail-end bulkhead 205 includes three flow windows 225. The head-end bulkhead 203 and the tail-end bulkhead 205 are not limited by the shape, size, number, or position of flow windows. For example, the flow window(s) may be circularly shaped, square shaped, rectangularly shaped, or shaped as any polygon. The first base 210, the head-end bulkhead 203, and the tail-end bulkhead 205 may be created by a chemically stable material that has a density less than 1.0. In other words, the first base 210, the head-end bulkhead 203, and the tail-end bulkhead 205 may be created by a chemically stable material that can float in water. This feature would allow the first vessel 210 to be used in water without further structural or floating support.

In an embodiment, the first vessel 201 may also include a quiet-zone bulkhead (not depicted). The quiet-zone bulkhead may be similar in size, and shape to the head-end and the tail-end bulkheads 203 and 205. Additionally, the quiet-zone bulkhead (not depicted) may include one, two, or three flow windows. Further, the quiet-zone bulkhead (not depicted) may be located a distance from the tail-end bulkhead 205 and mechanically secured to the first base 210. The distance is small enough to allow for the second vessel 202 to be nested within a second distance from the quiet-zone bulkhead (not depicted) to the head-end bulkhead 203.

Similarly, the second base 211 includes a second head-end edge 230, a second tail-end edge 231, a third side edge 242, and a fourth side edge 243. That is, the second base 211 is rectangular sheet when laid flat. In alternative embodiments, the second base 211 may be of any shape that can be laid flat. The second base 211 extends along a second centerline axis 291 from the second head edge 230 to the second tail edge 231. The second base 211 also extends partially around the second centerline axis 291 as the second base 211 extends from the third side edge 232 to the fourth side edge 233. In an embodiment, the second base 211 extends parallel to the second centerline axis 291 as it extends from the second head edge 230 to the second tail edge 231. Further, in an embodiment, the second base 211 extends in a semi-circular shape with the second centerline axis 291 at a center as the second base 211 extends partially around the second centerline axis 291 from the third side edge 242 to the fourth side edge 243. That is, the second base 211 creates a convex shape. In alternative embodiments, the second base 211 may extend in any shape (e.g., "U" shape) as the second base 211 extends partially around the second centerline axis 291 from the third side edge 242 to the fourth side edge 243.

Moreover, and similar to the first vessel 201, a portion of the second head-end bulkhead 204 is mechanically attached to the second head edge 230. In an embodiment, the second headend bulkhead 204 is imperviously (i.e., water-tight) sealed to the second head edge 230. In another embodiment, the second head-end bulkhead 204 is removable attached to the head edge 230 via clips, latches, or other known mechanical fastening devices. The second tail-end bulkhead 206 is mechanically attached to the second tail edge 231. In an embodiment, the tailend bulkhead 205 is imperviously (i.e., water-tight) sealed to the second tail edge 231. In another embodiment, the second tail-end bulkhead 206 is removably attached to the second tail edge 231 via clips, latches, or other known mechanical fastening devices. The second head-end bulkhead 204 includes a third flow window 234 and the second tail-end bulkhead 206 includes a fourth flow window 235. In an embodiment, the second head-end bulkhead 204 includes a plurality of (e.g., two or more) flow windows 234 and the second tail-end bulkhead 206 includes a plurality (e.g., two or more) of three flow windows 235. The second head-end bulkhead 204 and the second tail-end bulkhead 206 are not limited by the shape, size, number, or position of flow windows. For example, the flow window(s) may be circularly shaped, square shaped, rectangularly shaped, or shaped as any polygon.

The second base 211 also includes a plurality of apertures 207. The apertures 207 allow for water or other materials to flow/drop through the second base 211. The apertures 207 may be of different shapes, sizes and positioned randomly throughout the second base 211. In an embodiment, the shape, size, position of all of the plurality of apertures 207 is maximized to provide the most habitable environment for a particular species marine life.

The second base 211, the second head-end bulkhead 204, and the second tail-end bulkhead 206 may be created by a chemically stable material that has a density less than 1.0. In other words, the second base 211, the second head-end bulkhead 204, and the second tail-end bulkhead 206 may be created by a chemically stable material that can float in water. This feature would allow the second vessel 202 to be suspended within water in the first vessel 201. That is the second vessel 202 would suspend (i.e., nest) itself within the first vessel 201 via a buoyant force without further mechanical support. In alternative embodiments, the second vessel 202 may be nested (i.e., suspended) within the first vessel 201 via struts or hung via an over-hanging support. In other words, the second vessel 202 is smaller in size than the first vessel 201 such that the second vessel may sit (i.e., nest) inside of the first vessel 201 while leaving space between a bottom of the second vessel 202 and a bottom of the first vessel 201.

Further, in an embodiment, there may be a third vessel (not depicted) that is similarly shaped and similar in construction as the second vessel 202. The third vessel (not depicted) may be smaller than the second vessel 202 such that the third vessel (not depicted) may be nested within the second vessel 202. In an embodiment, there may be upwards of fourteen different vessels each constructed similarly to the second vessel and each sized as to nest (i.e., be suspended) within the previous vessel.

FIG. 3 depicts an isometric view of a first vessel 300 in accordance with an illustrative embodiment. The first vessel 300 includes a first base 310, a head-end bulkhead 303, and a tail-end bulkhead 305. In an embodiment, the first vessel 300 may also include a quiet zone bulkhead (not depicted). The first base 310 is a solid, impervious material. As depicted, the head-end bulkhead 303 and the tail-end bulkhead 305 can be removed from the first base 310 and the first base 310 may be laid flat and rolled up. That is, the material used for the first base 310 is a chemically stable material that is capable of being rolled into a roll. This allows for the relatively large first vessel 300 to be easily packaged into manageable sizes that can be cheaply and efficiently handled shipped. Additionally, as stated above, the first base 310, the head-end bulkhead 303, and the tail-end bulkhead 305 may be created by a chemically stable material that has a density less than 1.0. In other words, the first base 310, the head-end bulkhead 303, and the tail-end bulkhead 305 may be created by a chemically stable material that can float in water. This feature allows for the first vessel 310 to be used in water without further structural or floating support.

FIG. 4 depicts an isometric view of a second vessel 400 in accordance with an illustrative embodiment. The second vessel 400 includes a second base 410, a second head-end bulkhead 404, and a second tail-end bulkhead 406. The second base 410 includes a plurality of apertures 407. As depicted, the second head-end bulkhead 404 and the second tail-end bulkhead 406 can be removed from the second base 410 and the first base 410 may be laid flat and rolled up. That is, the material used for the first base 410 is a chemically stable material that is capable of being rolled into a roll. This allows for the relatively large second vessel 400 to be easily packaged into manageable sizes that can be cheaply and efficiently handled and shipped. Additionally, as stated above, the second base 410, the second head-end bulkhead 403, and the second tail-end bulkhead 405 may be created by a chemically stable material that has a density less than 1.0. In other words, the second base 410, the second head-end bulkhead 403, and the second tail-end bulkhead 405 may be created by a chemically stable material that can float in water. This feature allows for the second vessel 410 to be used in water without further structural or floating support. Also, as stated above, a nested raceway system may include a plurality (e.g., two, three, four, five, six, seven, or more) of differently sized vessels that are similarly shaped, formed, and constructed as the second vessel 400.

Figure 5:
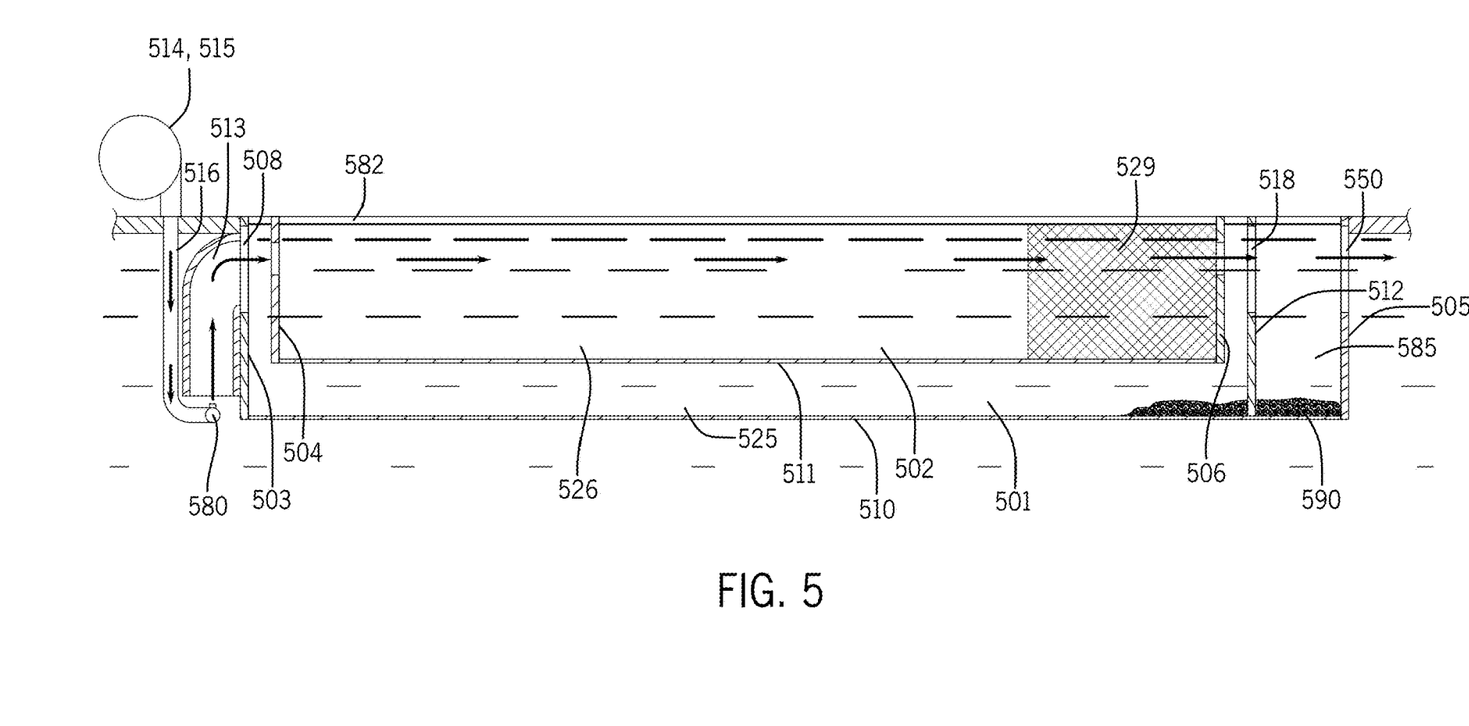
FIG. 5 depicts a vertical cross-sectional view of a nested raceway system in accordance with an illustrative embodiment.

FIG. 5 depicts a vertical cross-sectional view of a nested raceway system 500 in accordance with an illustrative embodiment. The nested raceway system 500 includes a first vessel 501 and a second vessel 502. The first vessel 501 includes a first base 510, a head-end bulkhead 503, and a tail-end bulkhead 505, and a quiet-zone bulkhead 512. The second vessel 502 includes a second base 511, a second head-end bulkhead 504, and a second tail-end bulkhead 506. The second base 511 includes a plurality of apertures (not depicted). The second vessel 502 is nested (i.e. suspended) within the first vessel 501 between the head-end bulkhead 503 and the quiet-zone bulkhead 512. In an embodiment, the second vessel 502 is suspended (i.e., nested) within the first vessel 501 via a buoyant force created by the low density materials that comprise the second vessel 502. Further, the first vessel 501 and the second vessel 502 may be mechanically connected such that the second vessel 502 is held stationary within the first vessel 501. In alternative embodiments, the second vessel 502 is suspended (i.e., nested) within the first vessel 501 via structural supports, a buoyant force created by an attached floatation device, or by an overhead support system.

The head-end bulkhead 503 includes a first flow window 508. In an embodiment, the head-end bulkhead 503 may include more than one (e.g., one, two, three, or more) first flow windows 508. The tail-end bulkhead 505 includes a second flow window 550. In an embodiment, the tail-end bulkhead 505 may include more than one (e.g., one, two, three, or more) second flow windows 550. In an embodiment, each of the first and second flow windows 508 and 550 may each include removable and adjustable flow window stoppers (not depicted). The removable and adjustable flow window stoppers (not depicted) allow for a user to control the flowage of flow-able materials (e.g., water and air) that pass through the nested raceway system. The removable and adjustable flow window stoppers (not depicted) may be of any known mechanisms that allow for a block to be selectively and adjustably moved into and out of the openings of a particular one of each of the first and second flow windows 508 and 550 of the head-end and tail-end bulkheads 503 and 505.

The nested raceway system 500 may also include an airlift 513 and a blower 515. The blower 515 may include a motor 514 capable of forcing air into a tube 516 that extends from the end of the motor to a distal end 580 of the airlift 513. In an embodiment, the airlift 513 is created from the same materials used for the first vessel 501. The airlift 513 is a curved piece of material (e.g. tubing) that mechanically attaches (i.e., connects) to a portion of the head-end bulkhead 503 to the distal end 580. More specifically, the airlift 513 attaches to the portion of the head-end bulkhead 503 around the first window 508. The airlift guides flowing materials (e.g., water and air) into the first window 508. Specifically, the blower 515 forces air into a space 580 between the distal end 580 of the airlift 513 and the head-end bulkhead 503 (i.e., a space below a water line 582). The air forced into the space 580 creates a flow of water and air that travels up the airlift 513 and into the first window 508. The flow continues throughout the first vessel 501 (i.e., through and around the second vessel) and through a quiet-zone bulkhead flow window 518 and through the second flow window 550. In alternative embodiments, the airlift is removed from the nested raceway system 500 so that the nested raceway system 500 can use a natural current. In other words, the airlift 513 can be removed such that the airlift 513 does not obstruct the first flow window and natural currents below the water line 582 can be utilized to create a flow of water and other materials throughout the first vessel 501.

The quiet-zone bulkhead 512 is mechanically attached to the first base 510 at a distance from the tail-end bulkhead 505. The distance defines a quiet-zone 585 where the flowage is less than the other areas of the first vessel 501. The decrease of flowage allows for sediment, mineral, algae, and other materials 590 to settle in the bottom the quiet-zone 585. In an example, the algae collected at the bottom of the quiet-zone 585 may be removed and extruded to create bio-diesel fuel. This fuel can then be used to supplement fuels used to operate a diesel generator (not depicted) and create electricity that powers the blower 515. Thus, reducing the carbon footprint of the nested raceway system 500. In another example, the material collected from the quiet-zone may be separated and portions sold as fertilizer.

The nested raceway system 500 defines a first habitat 525 and a second habitat 526. That is, there is the second habitat 526 in the second vessel 502 that is suitable for one type of marine species (e.g., shell fish) that is separate from the first habitat 525 (e.g., outside of the second vessel 502 but inside of the first vessel 501) that may be suitable for a different type of marine species (e.g., small trout). Thus, the nested raceway system 500 defines two habitats 525 and 226 which allows for maximized conditions for multiple species of marine life.

Additionally, the nested raceway system 500 may also include vertically hung material 529. The vertically hung material 529 may be made of any bio-friendly netting. The vertically hung material 529 extends the entire length of the second vessel 502 and also extends from above the waterline 582 to the bottom of the second vessel 502. In an embodiment, the vertically hung material 529 may be in the first vessel 501, second vessel 502, or any other vessel that may be included in a given nested raceway system 500. The size of holes in any netting of the vertically hung material 529 will vary depending upon the specific species marine life desired. Further, there may be two vertically hung materials 529 in the second vessel 502. The vertically hung material 529 divides the second vessel into two habitats or creates a smaller habitat. The vertically hung material 529 may be suspended in any vessel via any mechanical means. Further, the vertically hung material 529 may include weights on the bottom to ensure that the vertically hung material 529 extends the entire depth of a given vessel. The benefit of creating two habitats is similar to that stated above. Further, creating a smaller habitat is beneficial to some species of marine life and is adjustable as that species of marine life grows, which may reduce the number of raceways certain fisheries need. Lastly, the bio-netting of the vertically hung material 529 may allow for algae and other organisms to collect and grow on the bionetting, thus providing a nearby source of reproducing food while serving as visual blocks and reducing territorial stress factors.

Figure 6:
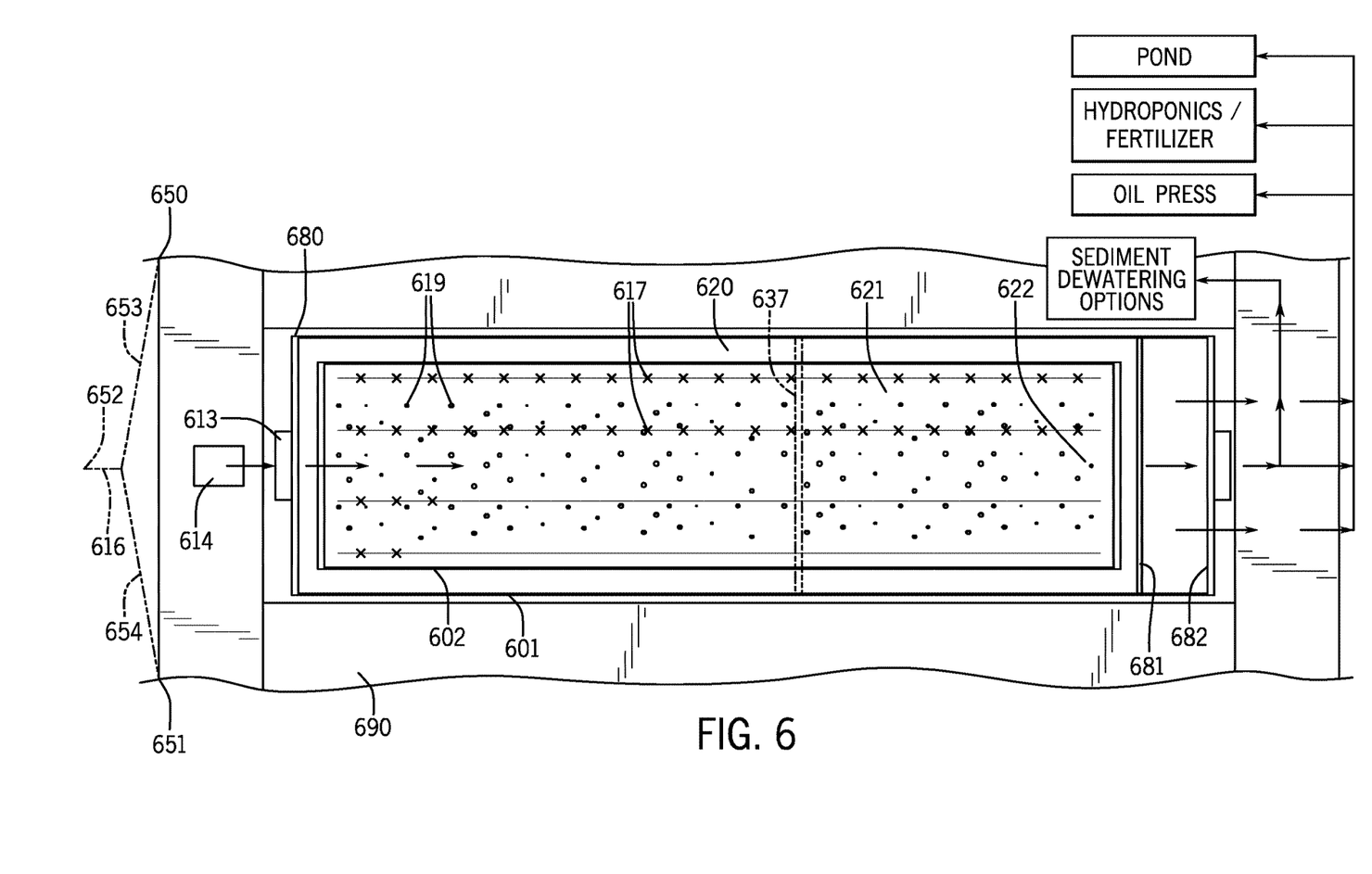
FIG. 6 depicts a birds-eye view of a nested raceway system in accordance with an illustrative embodiment.

FIG. 6 depicts a flow diagram and a birds-eye view of a nested raceway system in accordance with an illustrative embodiment. The flow diagram and birds-eye view of a nested raceway system 600 include a docking system 690, a first vessel 601, and a second vessel 602, a plurality of vertically hung materials 617, an airlift 613, a blower 614, and a single point anchor system 616. The plurality of vertically hung materials define a first habitat 620, a second habitat 621, a third habitat 622 within the second vessel 602. The first vessel 601 includes a head-end bulkhead 680, a quiet-zone bulkhead 681, and a tail-end bulkhead 682. The airlift is mechanically connected to the head-end bulkhead 680. The blower 614 is located above the water line and has an air tube (not depicted) that extends to below the airlift 613. The second vessel includes a plurality of apertures 619 that allow for algae, sediment, and/or small species of marine life to travel/drop out of the second vessel 602 within the first vessel 601. In an embodiment, the second vessel 602 may also include an adjustable bulkhead 637 that can be moved throughout a life progression of habituating marine life. The adjustable bulkhead 637 may be affixed to a rail system or simply mechanically latched to an edge of the second vessel 602.

As discussed above, the airlift is 613 may be removable so that the nested raceway system 600 can utilize underwater currents for the flowage through the nested raceway system. However, the currents in a given environment may be changed by wind, lunar patterns, or other external forces. The single point anchor system 616 includes an anchor 652, a first line 653, and a second line 654. The first and second line 653 and 654 may be a rope, chain, or any other device designed to hold an anchor to a floating system. The first line 653 is mechanically secured to a first corner 650 of the nested raceway system 600 and the second line 654 is mechanically secured to a second corner 651 of the nested raceway system 651. The first and second lines 653 and 654 extend and mechanically attach to the anchor 652. The single point anchor system 616 allows for the nested raceway to naturally pivot and adjust to the water current in any environment where this may be necessary (e.g., a location where electricity is sparse).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus for use in water with flowable material comprising:
    a first vessel comprising:
        a first base comprising a head edge, a tail edge, a first side edge, and a second side edge;
        the first base further comprising a chemically stable-in-water water-impervious sheet material;
        wherein the first base extends from the head edge along a first centerline axis to the tail edge, and extends from the first side edge partially around the first centerline axis to the second side edge; and,
a head-end bulkhead mechanically secured to the head edge from the first edge to the second edge, and a tail-end bulkhead mechanically secured to the tail edge from the first edge to the second edge, wherein the head-end bulkhead comprises a first flow window, and the tail-end bulkhead comprises a second flow window;
a second vessel comprising:
a second base comprising a second head edge, a second tail edge, a third side edge, and a fourth side edge;
wherein the second base extends from the second head edge along a second centerline axis to the tail edge, and extends from the third side edge partially around the second centerline axis to the fourth side edge;
a second head-end bulkhead mechanically attached to the second head-end, and a second tail-end bulkhead mechanically attached to the second tail-end, wherein the second head-end bulkhead comprises a third flow window, and the second tail-end bulkhead comprises a fourth flow window;
the second base further comprising a chemically stable-in-water sheet material that is water-impervious except at a plurality of apertures;
wherein (i) the first flow window is horizontally aligned with at least a portion of the third flow window and (ii) the second vessel is nested in the first vessel and defines a first habitat and a second habitat; and,
wherein at least one bulkhead substantially prevents the flowable material from entering a respective vessel through the bulkhead except by passing through a respective flow window in the bulkhead.

2. The apparatus of claim 1 further comprising:
a third vessel comprising:
a third base comprising a third head edge, a third tail edge, a fifth side edge, and a sixth side edge, wherein the third base extends from the third edge along a third centerline axis to the tail edge, and extends from the fifth side edge partially around the third centerline axis to the sixth side edge;
a third head-end bulkhead mechanically attached to the third head-end, and a third tail-end bulkhead mechanically attached to the third tail edge, wherein the third head-end bulkhead comprises fifth flow window, and the third tail-end bulkhead comprises a sixth flow window;
the third base further comprising a plurality of apertures;
wherein the third vessel is nested within the second vessel.

3. The apparatus of claim 1, wherein the base is comprised of a chemically stable material that has a density of less than water.

4. The apparatus of claim 1, the first vessel further comprising a quiet-zone bulkhead mechanically attached to the first base from the first side edge to the second side edge and located between the tail-end bulkhead of the first vessel and the tail-end bulkhead of the second vessel, wherein the quiet-zone bulkhead comprises another flow window.

5. The apparatus of claim 1, wherein the first centerline axis and the second centerline axis are the same axis.

6. The apparatus of claim 1, wherein the first side edge extends to the second side edge along an arc for at least one of the first vessel and the second vessel, the head-end bulkhead further comprises a first semi-circular shape, and the tail-end bulkhead further comprises a second semi-circular shape.

7. The apparatus of claim 6, wherein the arc, the first semi-circular shape, and the second circular shape are concentric.

8. The apparatus of claim 1, further comprising a vertically hung material, wherein the vertically hung material extends parallel to the second centerline axis from the second head edge to the second tail edge, and wherein the vertically hung material extends from above a waterline to the second base.

9. The apparatus of claim 8, wherein the vertically hung material comprises a plurality of apertures.

10. The apparatus of claim 8, wherein the vertically hung material is a bio-friendly netting.

11. The apparatus of claim 1, wherein the first base and the second base are each one piece of continuous material.

12. The apparatus of claim 1, wherein the first base and the second base are each flexible and rollable.

13. The apparatus of claim 1, the head-end bulkhead further comprising an eighth flow window and a ninth flow window.

14. The apparatus of claim 1, wherein at least one of the first vessel and the second vessel has each of its bulkheads that substantially prevents flowable material from entering a respective vessel through the bulkheads except by passing through a respective flow window in the bulkheads.

15. The apparatus of claim 14, wherein each of the vessels has each of its bulkheads that substantially prevents flowable material from entering a respective vessel through the bulkheads except by passing through a respective flow window in the bulkheads.

16. A system comprising:
a raceway comprising:
a first vessel comprising:
a first base comprising a head edge, a tail edge, a first side edge, and a second side edge;
wherein the first base extends from the head edge along a first centerline axis to the tail edge, and extends from the first side edge partially around the first centerline axis to the second side edge; and,
a head-end bulkhead mechanically secured to the head edge from the first edge to the second edge, and a tail-end bulkhead mechanically secured to the tail edge from the first edge to the second edge, wherein the head-end bulkhead comprises first flow window, and the tail-end bulkhead comprises a second flow window;
a second vessel comprising:
a second base comprising a second head edge, a second tail edge, a third side edge, and a fourth side edge;
wherein the second base extends from the second head edge along a second centerline axis to the tail edge, and extends from the third side edge partially around the second centerline axis to the fourth side edge;
a second head-end bulkhead mechanically attached to the second head-end, and a second tail-end bulkhead mechanically attached to the second tail-end, wherein the second head-end bulkhead comprises a third flow window, and the second tail-end bulkhead comprises a fourth flow window;

the second base further comprising a plurality of apertures; and, wherein the second vessel is nested in the first vessel;

an airlift mechanically attached to the first window that extends in a curved shape to a distal end;

a blower comprising a motor and a tube, wherein the tube extends from the motor to the distal end of the airlift;

a dock, wherein the dock extends around the first vessel and is mechanically attached to the first vessel; and an anchor.

17. The system of claim 16, wherein the anchor is a single-point-anchoring system attached to the first vessel.

18. The system of claim 16, the first vessel further comprising a quiet-zone bulkhead imperviously sealed to the material from the first edge to the second edge and located between the tail-end bulkhead of the first vessel and the tail-end bulkhead of the second vessel, and wherein the quiet-zone bulkhead comprises a third flow window.

19. The system of claim 18, wherein the distance from the quiet-zone bulkhead to the tail-end bulkhead defines a quiet-zone.

20. The system of claim 19, wherein the system further comprises a pump, wherein the pump includes a motor and a hose, wherein the hose extends from a bottom of the quiet-zone to the pump and may be used to remove settled solids from the quiet zone.

21. The system of claim 16, wherein the airlift is removable from the first vessel.

22. The system of claim 16, wherein the first flow window is horizontally aligned with at least a portion of the third flow window.

23. An apparatus comprising:
a first vessel comprising:
a first base comprising a head edge, a tail edge, a first side edge, and a second side edge;

wherein the first base extends from the head edge along a first centerline axis to the tail edge, and extends from the first side edge partially around the first centerline axis to the second side edge; and, a head-end bulkhead mechanically secured to the head edge from the first edge to the second edge, and a tail-end bulkhead mechanically secured to the tail edge from the first edge to the second edge, wherein the head-end bulkhead comprises a first flow window, and the tail-end bulkhead comprises a second flow window;

a second vessel comprising:
a second base comprising a second head edge, a second tail edge, a third side edge, and a fourth side edge;

wherein the second base extends from the second head edge along a second centerline axis to the tail edge, and extends from the third side edge partially around the second centerline axis to the fourth side edge;

a second head-end bulkhead mechanically attached to the second head-end, and a second tail-end bulkhead mechanically attached to the second tail-end, wherein the second head-end bulkhead comprises a third flow window, and the second tail-end bulkhead comprises a fourth flow window;

the second base further comprising a plurality of apertures;

wherein the second vessel is nested in the first vessel and defines a first habitat and a second habitat; and, wherein the first vessel further comprising a quiet-zone bulkhead mechanically attached to the first base from the first side edge to the second side edge and located between the tail-end bulkhead of the first vessel and the tail-end bulkhead of the second vessel and the quiet-zone bulkhead comprises another flow window.

* * * * *